United States Patent
Sunako et al.

(10) Patent No.: US 8,246,801 B2
(45) Date of Patent: Aug. 21, 2012

(54) SUPPORT STRUCTURE OF ELECTROOSMOTIC MEMBER, ELECTROOSMOSIS PUMP, ELECTRIC POWER GENERATION APPARATUS AND ELECTRONIC EQUIPMENT

(75) Inventors: Takayuki Sunako, Akishima (JP); Yasunari Kabasawa, Hanno (JP)

(73) Assignee: Casio Computer Co., Ltd., Tokyo (JP)

( * ) Notice: Subject to any disclaimer, the term of this patent is extended or adjusted under 35 U.S.C. 154(b) by 1314 days.

(21) Appl. No.: 11/895,743

(22) Filed: Aug. 27, 2007

(65) Prior Publication Data

US 2008/0070088 A1    Mar. 20, 2008

(30) Foreign Application Priority Data

Sep. 14, 2006    (JP) ................................ 2006-249357

(51) Int. Cl.
*F04F 99/00*    (2009.01)
(52) U.S. Cl. ........................................ 204/450; 429/55
(58) Field of Classification Search .................. 204/450, 204/600; 417/41, 48; 429/55, 79
See application file for complete search history.

(56) References Cited

U.S. PATENT DOCUMENTS

| | | | | | |
|---|---|---|---|---|---|
| 5,007,806 | A | * | 4/1991 | Bellis et al. | 417/360 |
| 5,571,410 | A | * | 11/1996 | Swedberg et al. | 210/198.2 |
| 6,193,329 | B1 | * | 2/2001 | Kanauchi | 303/116.4 |
| 6,984,925 | B2 | | 1/2006 | Morley et al. | |
| 2004/0202557 | A1 | * | 10/2004 | Suzuki et al. | 417/410.4 |
| 2004/0234378 | A1 | | 11/2004 | Lovette et al. | |
| 2005/0249992 | A1 | | 11/2005 | Bitoh | |
| 2006/0029851 | A1 | | 2/2006 | Santiago et al. | |

FOREIGN PATENT DOCUMENTS

| | | |
|---|---|---|
| JP | 5-50356 U | 7/1993 |
| JP | 2004-178910 A | 6/2004 |
| JP | 2005-528829 A | 9/2005 |
| JP | 2006-022807 A | 1/2006 |

OTHER PUBLICATIONS

Chinese Office Action dated Jul. 10, 2009 and English translation thereof issued in a counterpart Chinese Application No. 2007101527055.
Japanese Office Action dated Oct. 18, 2011 (and English translation thereof) in counterpart Japanese Application No. 2006-249357.

* cited by examiner

*Primary Examiner* — Alex Noguerola
*Assistant Examiner* — Gurpreet Kaur
(74) *Attorney, Agent, or Firm* — Holtz, Holtz, Goodman & Chick, PC

(57) ABSTRACT

Disclosed a support structure of an electroosmotic member including: a support structure; an opening formed in the support member in which an electroosmotic member is disposed; and at least one of an elastic piece to separate the opening and the space from each other and to support the electroosmotic member, a cushioning filled in a gap between a wall of the opening and an edge of the electroosmotic member to support the electroosmotic member, and a projection provided on a wall of the opening to support the electroosmotic member, wherein the elastic piece, the cushioning and the projection supports the electroosmotic member which absorbs an impact or a vibration, and when the impact is applied to the support member (housing), an impact load applied to the electroosmotic member can be suppressed and thus, even when the impact is applied, it is possible to prevent the electroosmotic member from being damaged.

6 Claims, 9 Drawing Sheets

SUPPORT STRUCTURE OF ELECTROOSMOTIC MEMBER, ELECTROOSMOSIS PUMP, ELECTRIC POWER GENERATION APPARATUS AND ELECTRONIC EQUIPMENT

BACKGROUND OF THE INVENTION

1. Field of the Invention

The present invention relates to an electroosmosis pump using electroosmotic flow phenomenon, a support structure of an electroosmotic member provided in the electroosmosis pump, an electric power generation apparatus having an electroosmosis pump, and an electronic equipment having the electric power generation apparatus.

2. Description of Related Art

In recent years, a pump using an electroosmotic flow principle is known as a kind of pump for sending liquid (see Japanese Patent Application Laid-open Publication No. 2006-22807 for example). The electroosmosis pump sends liquid without a mechanically movable member and thus, the electroosmosis pump has a merit that it has a long lifetime. Japanese Patent Application Laid-open Publication No. 2006-22807 discloses the electroosmosis pump in which an electroosmotic member (28) is fitted into a cylindrical housing (pump body 24), the electroosmotic member is fixed and supported by the housing, and electrodes (31 and 32) are formed on both surfaces of the electroosmotic member.

SUMMARY OF THE INVENTION

The present invention has a merit that the electroosmotic member is prevented from being damaged even when an impact is applied.

According to the first aspect of the invention, a support structure of an electroosmotic member including: a support member; an opening formed in the support member in which the electroosmotic member is disposed; a space formed in the support member around the opening; and an elastic piece to separate the opening and the space from each other, and to support the electroosmotic member.

According to the second aspect of the invention, a support structure of an electroosmotic member, including: a support member; an opening formed in the support member in which an electroosmotic member is disposed; and a cushioning filled in a gap between a wall of the opening and an edge of the electroosmotic member to support the electroosmotic member.

According to the third aspect of the invention, a support structure of an electroosmotic member, including: a support member; an opening formed in the support member in which an electroosmotic member is disposed; and a projection provided on a wall of the opening to support the electroosmotic member.

According to the fourth aspect of the invention, an electroosmosis pump mounted in an electric power generation apparatus having a fuel cell, the electroosmosis pump including: a housing having a hollow portion; an electroosmotic member accommodated in the housing to partition the hollow portion into an introducing side and a discharge side; a space formed in the housing around the electroosmotic member; and an elastic piece which separates the hollow portion and the space from each other, and which supports the electroosmotic member.

According to the fifth aspect of the invention, An electroosmosis pump mounted in an electric power generation apparatus having a fuel cell, the electroosmosis pump including: a housing having a hollow portion; an electroosmotic member accommodated in the housing to partition the hollow portion into an introducing side and a discharge side; and a cushioning filled in a gap between a wall of the hollow portion and an edge of the electroosmotic member to support the electroosmotic member.

According to the sixth aspect of the invention, an electroosmosis pump mounted in an electric power generation apparatus having a fuel cell, the electroosmosis pump including: a housing having a hollow portion; an electroosmotic member accommodated in the housing to partition the hollow portion into an introducing side and a discharge side; and a projection provided on a wall of the hollow to support the electroosmotic member.

BRIEF DESCRIPTION OF THE DRAWINGS

The present invention will become more fully understood from the following detailed description and the appended drawings, and thus are not intended as a definition of the limits of the invention, and wherein.

DETAILED DESCRIPTION OF THE PREFERRED EMBODIMENTS

Preferred embodiments for executing the present invention will be explained using the drawings. Although various definitions which are technically preferable for executing the invention are described in the following embodiments, the scope of the invention is not limited to the embodiments and illustrated examples.

<First Embodiment>

Figure 1:
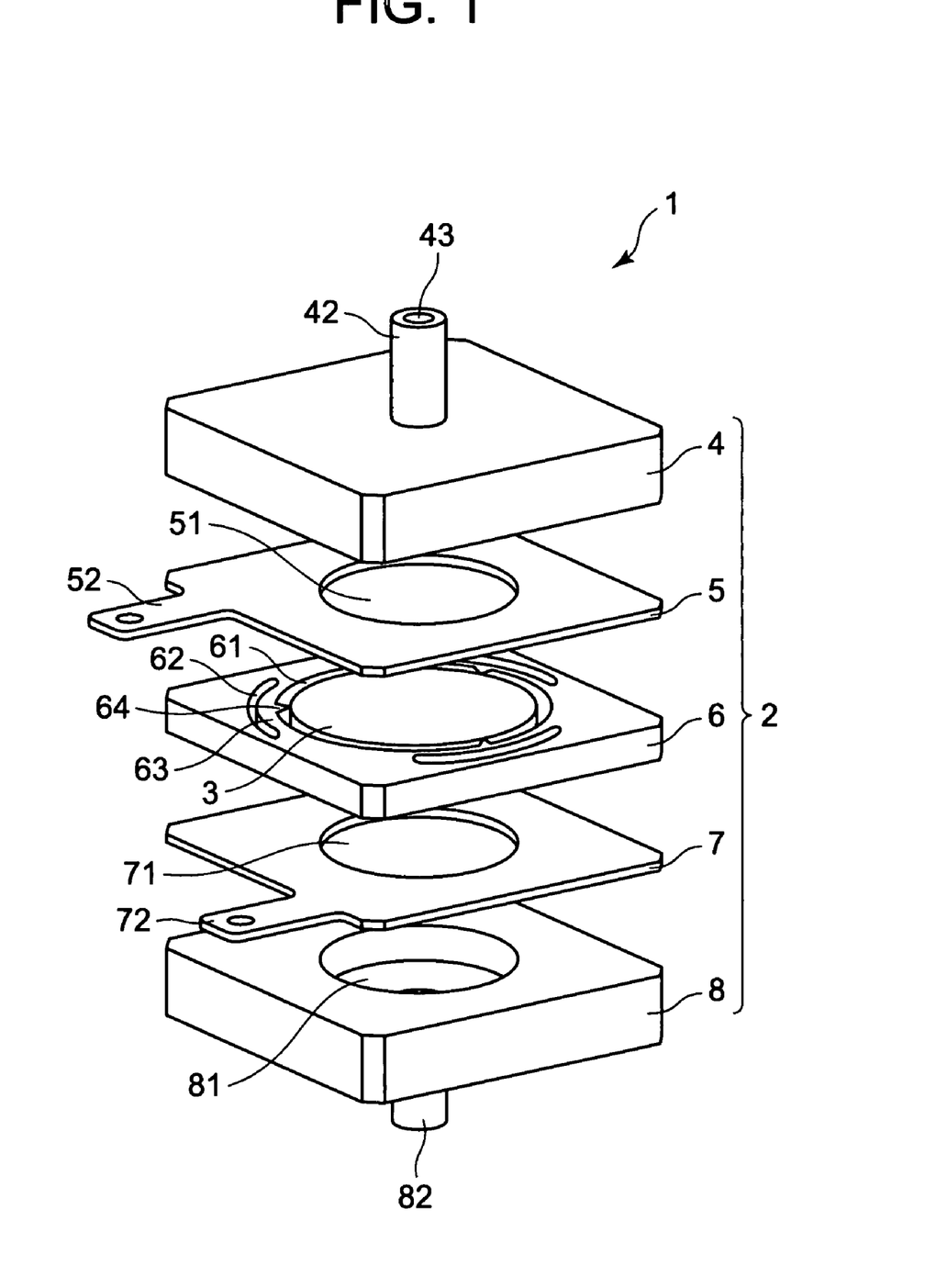
FIG. 1 is an exploded perspective view of an electroosmosis pump according to a first embodiment.
Figure 2:
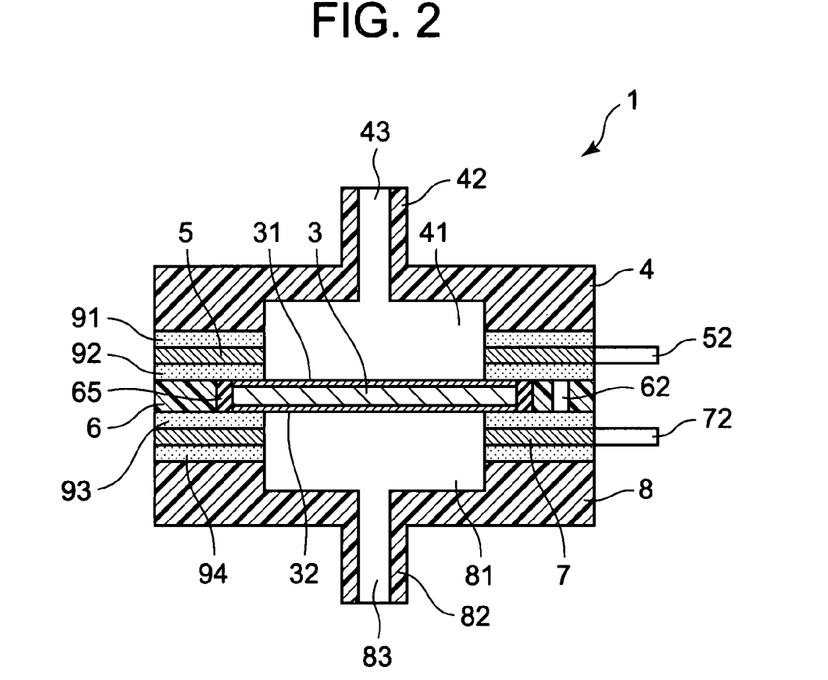
FIG. 2 is a vertical sectional view of the electroosmosis pump of the first embodiment.

FIG. 1 is an exploded perspective view of an electroosmosis pump 1, and FIG. 2 is a vertical sectional view of the electroosmosis pump 1.

As shown in FIGS. 1 and 2, the electroosmosis pump 1 includes a housing 2 having a hollow portion, and a thin plate-like electroosmotic member 3 which is accommodated in the hollow portion of the housing 2 and which partitions the hollow portion into an inlet side and an outlet side.

The electroosmotic member 3 is formed into a disk-like shape, and platinum electrode films 31 and 32 are formed on both surfaces of the electroosmotic member 3. Dielectric porous material, fiber material or particle filling material is used as the electroosmotic member 3 and here, silica fiber material is used as one example. The electrode films 31 and 32 of the electroosmotic member 3 are formed by sputtering, deposition or other vapor growth method. Since the electrode films 31 and 32 are formed by vapor growth method, the electrode films 31 and 32 are formed with a large number of micropores, and liquid permeates through the electrode films 31 and 32. The electrode films 31 and 32 may be formed as meshes so that liquid permeates through the meshes.

The housing 2 includes an inlet case 4, an electrode plate 5, a support frame 6, an electrode plate 7 and an outlet case 8. These members are adhered to form the housing 2 and with this, a hollow portion is formed in the housing 2. The inlet case 4, the electrode plate 5, the support frame 6, the electrode plate 7 and the outlet case 8 will be explained below.

A circular inlet chamber 41 is formed in a lower surface of the inlet case 4 in a recessed manner, an inlet nipple 42 is provided on an upper surface of the inlet case 4 in a projecting manner, and an introducing hole 43 is formed from a tip end of the inlet nipple 42 to the inlet chamber 41 along a center line of the inlet nipple 42.

A circular through hole 51 is formed in a central portion of the electrode plate 5, and a contact piece 52 extends from an outer peripheral edge of the electrode plate 5. A lead wire is connected to the contact piece 52.

A circular opening 61 is formed in a central portion of the support frame 6. The electroosmotic member 3 is disposed in the opening 61 and supported therein. The electroosmotic member 3 will be explained concretely using a plan view of FIG. 3 based on a support structure of the support frame 6.

Figure 3:
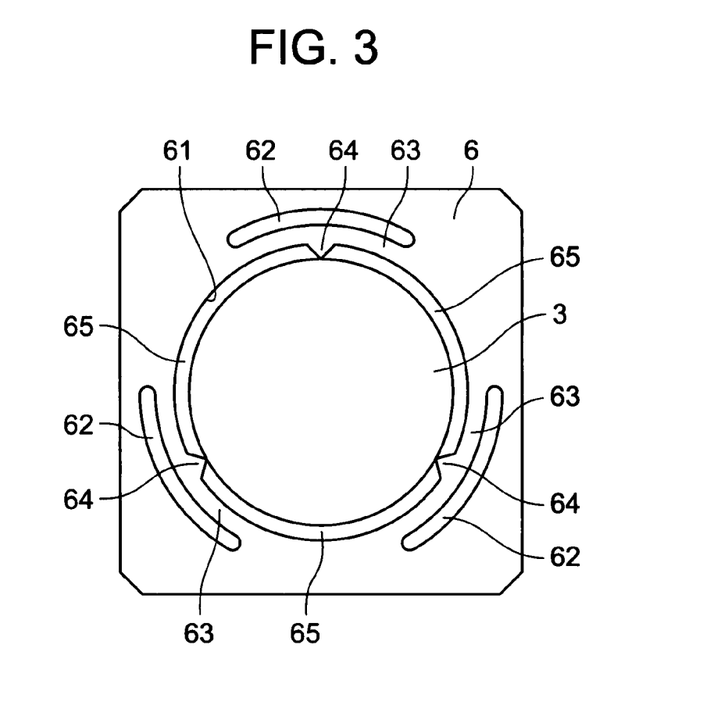
FIG. 3 is a plan view of a support member and an electroosmotic member in the first embodiment.

As shown in FIG. 3, three attenuation chambers 62 as spaces are formed in the support frame 6 around the opening 61. Each attenuation chamber 62 is a hole penetrating the support frame 6 from its upper surface to its lower surface, and the attenuation chamber 62 is formed into an arc along a circumferential direction of the opening 61. Since the attenuation chambers 62 penetrate the support frame 6, elastic pieces 63 for partitioning the attenuation chambers 62 and the opening 61 are formed, and each of the elastic pieces 63 is also formed into an arc along the circumferential direction of the opening 61. Projections 64 are provided at central portions of the elastic pieces 63 in the circumferential direction. The projections 64 project toward the center of the opening 61. An electroosmotic member 3 is fitted into the opening 61, an edge of the electroosmotic member 3 abuts against the three projections 64, and the electroosmotic member 3 is supported by the three projections 64 and three elastic pieces 63. The thickness of the support frame 6 is equal to that of the electroosmotic member 3, and both surfaces of the support frame 6 are flush with both surfaces of the electroosmotic member 3. The three projections 64 are arranged at equal angles along the circumferential direction of the opening 61.

The number of the attenuation chambers 62 provided in the support frame 6 is not limited to three, and one, two, four or more attenuation chambers 62 may be provided. The number of the projections 64 need not be three, but if three or more projections 64 are used, the position of the electroosmotic member 3 can reliably be determined. When the number of the elastic pieces 63 is one or two, if another projection in addition to the projections 64 is provided inside of the opening 61, the position of the electroosmotic member 3 can reliably be determined.

A cushioning 65 is filled in a gap between the edge of the electroosmotic member 3 and a wall of the opening 61. A rubber elastic material is used as the cushioning 65. An example of such cushioning 65 is solidified adhesive. A rubber elastic material which satisfies rubber hardness JIS-A 30 to 40° is used as the cushioning 65. As concrete material of the cushioning 65, if fluorine-based elastomer (e.g., "SIFEL (registered trademark)" produced by Shin-Etsu Chemical Co., Ltd., or silicone-based gel (e.g., "αGEL (registered trademark)" produced by Geltec Co., Ltd. is used, the cushioning 65 has resistance property against alcohol-based liquid. Since FIG. 1 is the exploded perspective view before the electroosmosis pump 1 is assembled, the gap between the edge of the electroosmotic member 3 and the wall of the opening 61 is not yet filled with the cushioning 65, but when the electroosmosis pump 1 is actually assembled, the gap is filled with the cushioning 65 as shown in FIG. 2.

Next, the electrode plate 7 and the outlet case 8 will be explained using FIGS. 1 and 2. The electrode plate 7 is provided in the same manner as that of the electrode plate 5, a through hole 71 is formed at a central portion of the electrode plate 7, and a contact piece 72 extends from an outer peripheral edge of the electrode plate 7. The outlet case 8 is provided in the same manner as that of the inlet case 4, an outlet chamber 81 is formed in an upper surface of the outlet case 8 in a recessed manner, an outlet nipple 82 is provided on an upper surface of the outlet case 8 in a projecting manner, and a discharge hole 83 is formed from a tip end of the outlet nipple 82 to the outlet chamber 81.

The electrode plate 5 and the electrode plate 7 are made of electrically conductive material such as metal and alloy. Materials of the electrode plate 5 and the electrode plate 7 have resistance property against liquid which is sent by the electroosmosis pump 1. For example, when methanol, ethanol or other alcohol is to be sent by the electroosmosis pump 1, it is preferable that good conductor such as phosphor bronze is used as materials of the electrode plate 5 and the electrode plate 7, and surfaces thereof are plated with nickel or gold to prevent electrode reaction.

Materials of the inlet case 4, the support frame 6 and the outlet case 8 have resistance property against liquid to be sent by the electroosmosis pump 1. When methanol, ethanol or other alcohol is to be sent by the electroosmosis pump 1, preferable materials of the inlet case 4, the support frame 6 and the outlet case 8 are PEI (polyether imide), PPS (polyphenylene sulfide), PES (polyether sulfone) in addition to PEEK (polyether ether ketone) as engineering plastic. These materials are softer than the electroosmotic member.

The electrode plate 5 is sandwiched between the support frame 6 and the inlet case 4. The electrode plate 5 and the inlet case 4 are adhered to each other by means of an adhesive 91, and the electrode plate 5 and the support frame 6 are adhered to each other by a conductive adhesive 92. An inner diameter of the inlet chamber 41 of the inlet case 4 and an inner diameter of the through hole 51 of the electrode plate 5 are almost equal to each other, and the inlet chamber 41 and the through hole 51 are superposed on each other. The inner diameter of the through hole 51 is smaller than a diameter of the electroosmotic member 3, and the electrode film 31 is electrically in contact with the electrode plate 5 through the conductive adhesive 92 at an edge of the electroosmotic member 3.

The electrode plate 7 is sandwiched between the support frame 6 and the outlet case 8. The support frame 6 and the electrode plate 7 are adhered to each other by a conductive adhesive 93, and the electrode plate 7 and the outlet case 8 are adhered to each other by an adhesive 94. An inner diameter of the outlet chamber 81 of the outlet case 8 and an inner diameter of the through hole 71 of the electrode plate 7 are almost equal to each other, and the outlet chamber 81 and the through hole 71 are superposed on each other. The inner diameter of the through hole 71 is smaller than a diameter of the electroosmotic member 3, and the electrode film 32 is electrically in contact with the electrode plate 7 through the conductive adhesive 93. A screw may penetrate from the outlet case 8 to the inlet case 4, the outlet case 8 may be fastened to the inlet case 4 by the screw, and the inlet case 4, the electrode plate 5, the support frame 6, the electrode plate 7 and the outlet case 8 may be bonded to each other without using the adhesive.

With the above-described structure, the attenuation chamber 62 functions as a damper which releases a stress of the elastic piece 63 in the structure supporting the electroosmotic member 3, and impact and vibration can be absorbed.

The support frame 6 is sandwiched and adhered between the electrode plate 5 and the electrode plate 7. With this, the attenuation chamber 62 can be formed as a hermetic space having high air-tightness. The attenuation chamber 62 is a gas chamber filled with gas such as air, but the attenuation chamber 62 may be filled with oil or rubber elastic material. The elastic constant as a damper can be adjusted in accordance with an air-tightness degree and an elastic degree of material to be filled.

The elastic constant as the damper can also be adjusted by adjusting a thickness of the elastic piece 63 in a direction intersecting with a radial direction of the electroosmotic member 3 (direction perpendicular to the paper sheet of FIG. 3), or by adjusting the shape of the attenuation chamber.

One example of materials of the adhesives 91 and 94 is fluorine-based elastomer (e.g., "SIFEL (registered trademark)" produced by Shin-Etsu Chemical Co., Ltd. One example of materials of the conductive adhesives 92 and 93 is a conductive adhesive having resistance property against methanol and keeping rubber elasticity after curing (e.g., "DOTITE" (registered trademark) produced by Fujikura kasei Co., Ltd.). If a silk-screen printing method is used as an application method of the adhesives 91 and 94 and the conductive adhesives 92 and 93, thicknesses of the adhesives 91 and 94 and the conductive adhesives 92 and 93 can be made equal (e.g., about 30 μm), and the adhering strength of the adhesives 91 and 94 and the conductive adhesives 92 and 93 can be enhanced.

A space from the introducing hole 43 to the inlet chamber 41 may be filled with a liquid-sucking body, and the liquid-sucking body may be in contact with the electrode film 31 in a face-to-face relation. The liquid-sucking body can absorb liquid such as a ceramic porous body, a fiber material, a nonwoven fabric and sponge.

Next, the operation of the electroosmosis pump 1 will be explained.

When liquid is supplied into the inlet chamber 41 through the introducing hole 43, the supplied liquid permeates through the electrode film 31 and is absorbed by the electroosmotic member 3. If voltage is applied between the electrode plate 5 and the electrode plate 7 in this state, an electric field is generated between the electrode film 31 and the electrode film 32, the liquid in the electroosmotic member 3 flows toward the electrode film 32 from the electrode film 31, and the liquid oozes outside of the electroosmotic member 3 from a surface of the electrode film 32. With this, a liquid flows from the inlet side introducing hole 43 to the outlet side discharge hole 83, and the liquid is sent toward the downstream by the electroosmosis pump 1. The cushioning 65 also functions as a seal material, and this prevents liquid from moving from the inlet chamber 41 to the outlet chamber 81 through the gap between the edge of the electroosmotic member 3 and the wall of the hole 61.

A direction of voltage between the electrode plate 5 and the electrode plate 7 is determined by a dielectric of the electroosmotic member 3 or liquid to be sent. When the dielectric of the electroosmotic member 3 comes into contact with liquid and the dielectric is negatively charged, voltage is applied such that potential of the electrode film 31 becomes higher than that of the electrode film 32. On the other hand, when the dielectric of the electroosmotic member 3 comes into contact with liquid and the dielectric is positively charged, voltage is applied such that potential of the electrode film 31 becomes lower than that of the electrode film 32. When the electroosmotic member 3 is porous silica and the liquid is mixture liquid of water and methanol, Si—OH (silanol group) is produced in the dielectric, the silanol group becomes Si—O—, and the silica surface is charged negatively. Positive ions (counter ions) in solution are collected in the vicinity of an interface, and positive electric charge becomes excessively high. If voltage is applied such that the electrode film 31 is a positive electrode and the electrode film 32 is a negative electrode, the excessive positive charge moves in the negative electrode direction, and the entire liquid flows in the negative electrode direction due to viscosity.

In the electroosmosis pump 1 provided as described above, since the electroosmotic member 3 is supported by the three projections 64 and the three elastic pieces 63, if vibration or impact is generated in the circumferential direction or radial direction of the electroosmotic member 3, the impact or vibration is transmitted to the elastic pieces 63. Therefore, the elastic pieces 63 are vibrated and a large load is not applied to the electroosmotic member 3. Even if the electroosmotic member 3 vibrates together with the elastic piece 63, the vibration is attenuated by gas in the attenuation chamber 62 or the elastic piece 63. As described above, the structure (projections 64, elastic pieces 63 and attenuation chamber 62) which supports the electroosmotic member 3 functions as a damper, impact and vibration can be absorbed and it is possible to prevent the electroosmotic member 3 from being damaged. Since the cushioning 65 is made of rubber elastic material, the absorbing effect of impact and vibration is further enhanced. Not only a dynamic load but also a static load (load generated by size fluctuation due to thermal expansion or the like) is not applied to the electroosmotic member 3 because the elastic pieces 63 are deformed, and it is possible to prevent the electroosmotic member 3 from being damaged.

The three projections 64 are arranged at equal angles from one another along the circumferential direction of the opening 61, a barycenter of the electroosmotic member 3 is located at the center of the opening 61, a load is equally dispersed and absorbed by the elastic pieces 63 and the attenuation chamber 62, and the shock absorption effect can further be enhanced.

The elastomer conductive adhesives 92 and 93 are interposed between the electroosmotic member 3 and the electrode plates 5 and 7. With this, an impact or a static load applied in a direction intersecting with a radial direction of the electroosmotic member 3 (direction perpendicular to the paper sheet of FIG. 3) are absorbed by the conductive adhesives 92 and 93.

Figure 4:
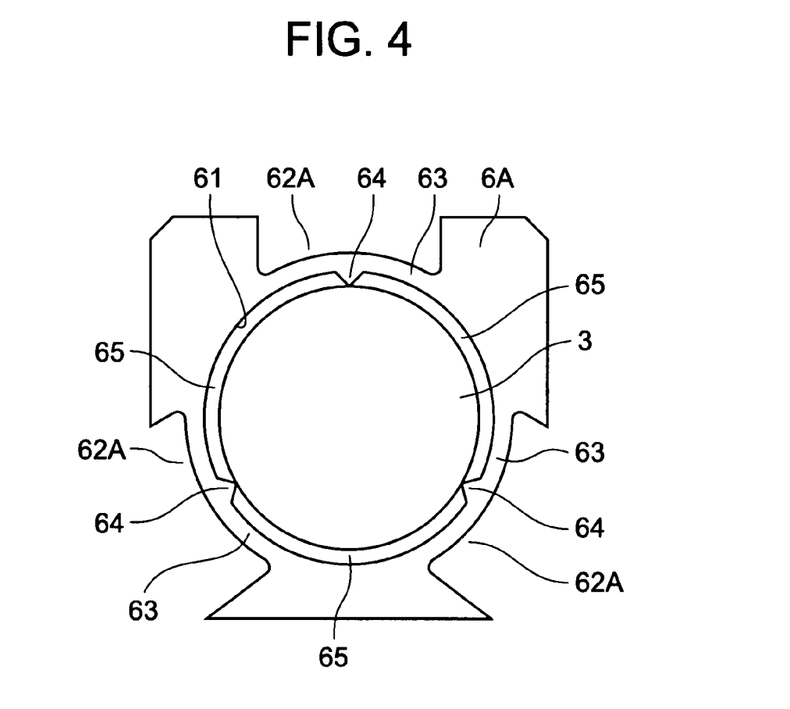
FIG. 4 is a plan view of a support member and an electroosmotic member according to a modification of the first embodiment.

In the first embodiment, the attenuation chamber 62 is a hole penetrating the upper surface to the lower surface of the support frame 6, the support frame 6 is sandwiched between the electrode plate 5 and the electrode plate 7 and with this, the attenuation chamber 62 is formed as the hermetic space, but the attenuation chamber 62 need not be the closed space. For example, as shown in FIG. 4, the support frame 6 may be a support frame 6A in which notches 62A which are recessed toward the center of the support frame in the radial direction are formed in edges of the support frame. With this, arc elastic pieces 63 which partitions the notch 62A and the opening 61 are formed. If the housing 2 is assembled such that the support frame 6A formed with the notches 62A is sandwiched between the electrode plate 5 and the electrode plate 6, the notches 62A become recesses which are recessed in the outer surface of the housing 2, and the electroosmotic member 3 is disposed inside of the recesses. That is, if the thickness of the elastic piece 63 in the radial direction which supports the electroosmotic member 3 becomes thinner than the thickness of the other portion of the support frame in the radial direction, a space formed in the support frame around the opening 61 of the support frame may be the attenuation chamber 62 formed by the hole or may be the notches 62A.

<Second Embodiment>

Figure 5:
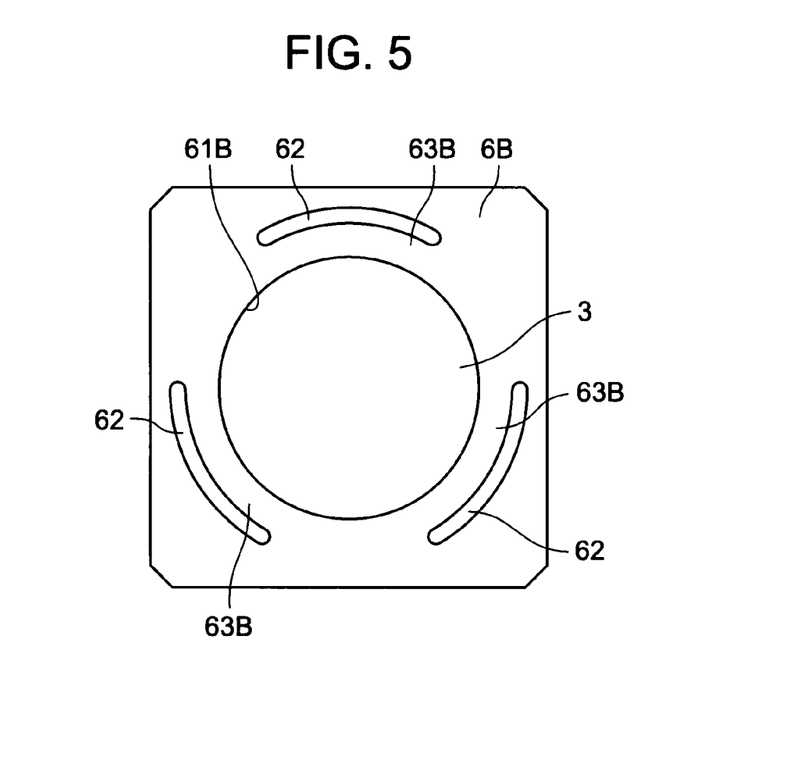
FIG. 5 is a plan view of a support member and an electroosmotic member according to a second embodiment.

The support structure of the electroosmotic member 3 may be changed to a structure as shown in a plan view in FIG. 5. In FIG. 5, a support frame 6B is sandwiched between the electrode plate 5 and the electrode plate 7 instead of the support frame 6 shown in FIGS. 1 to 3. The support frame 6B is provided with the attenuation chamber 62 and the elastic piece 63B of the support frame 6, but is not provided with the projection 64. The support frame 6B is formed at its central portion with a circular opening 61B, and the electroosmotic member 3 is fitted into the opening 61B without through the cushioning 65 and positioned therein. The thickness of the support frame 6B is equal to that of the electroosmotic member 3, and both surfaces of the support frame 6B are flush with both surfaces of the electroosmotic member 3. Other structure is the same as that of the first embodiment.

According to this structure also, in a structure supporting the electroosmotic member 3, the attenuation chamber 62 functions as a damper which releases a stress of the elastic piece 63B, impact and vibration can be absorbed, and the electroosmotic member 3 can be prevented from being damaged.

<Third Embodiment>

Figure 6:
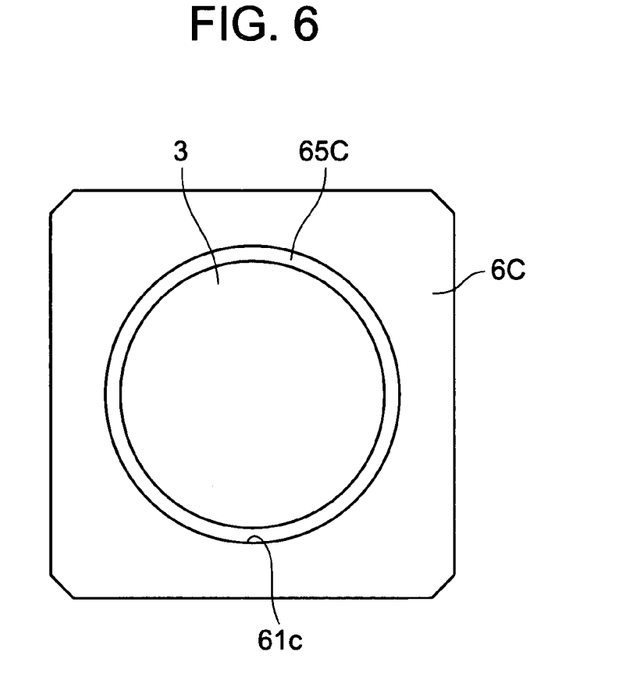
FIG. 6 is a plan view of a support member and an electroosmotic member according to a third embodiment.

The support structure of the electroosmotic member 3 may be changed to a structure as shown in a plan view in FIG. 6. In FIG. 6, a support frame 6C is sandwiched between the electrode plate 5 and the electrode plate 7 instead of the support frame 6 shown in FIGS. 1 to 3. The support frame 6C is not provided with the attenuation chamber 62, the elastic piece 63 and the projection 64 of the support frame 6. The support frame 6C is formed at its central portion with a circular opening 61C, the electroosmotic member 3 is fitted into the opening 61C, and a barycenter of the electroosmotic member 3 is located at the center of the opening 61C. The thickness of the support frame 6C is equal to that of the electroosmotic member 3, and both surfaces of the support frame 6C are flush with both surfaces of the electroosmotic member 3.

A gap between the edge of the electroosmotic member 3 and a wall of the opening 61C is filled with a cushioning 65C and with this, the electroosmotic member 3 is supported by the support frame 6C. It is preferable that the cushioning 65C is made of rubber elastic material and has resistance property against alcohol-based liquid. One or more hollow portions may be formed in the cushioning 65C. For example, a large number of bubble-like hollow portions may be provided in the cushioning 65C, or a hollow portion extending around the circumferential direction of the opening 61C by one turn may be provided in the cushioning 65 and the cushioning 65C may be provided in a form of a tube.

The support frame 6C is adhered to the electrode plate 5 by the conductive adhesive 92 like the support frame 6 in the first embodiment, and the electrode film 31 is electrically in contact with the electrode plate 5 through the conductive adhesive 92 at the edge portion of the electroosmotic member 3. The support frame 6C is adhered to the electrode plate 7 through the conductive adhesive 93, and the electrode film 32 is electrically in contact with the electrode plate 7 through the conductive adhesive 93 at the edge portion of the electroosmotic member 3. The electroosmotic member 3, the inlet case 4, the electrode plate 5, the electrode plate 7, the outlet case 8, the adhesives 91 and 94, and the conductive adhesive 92 and 93 are the same as those of the first embodiment.

In this embodiment, the electroosmotic member 3 is supported by the cushioning 65C. Therefore, when the electroosmotic member 3 receives vibration or impact in the circumferential direction or radial direction, the cushioning 65C is deformed and thus, a large load is not applied to the electroosmotic member 3. Thus, it is possible to prevent the electroosmotic member 3 from being damaged.

<Fourth Embodiment>

Figure 7:
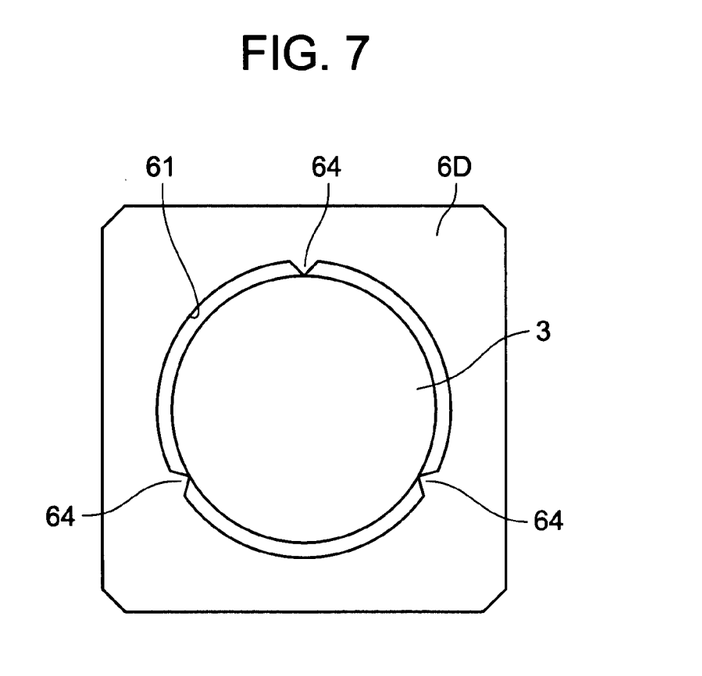
FIG. 7 is a plan view of a support member and an electroosmotic member according to a fourth embodiment.

The support structure of the electroosmotic member 3 may be changed to a structure as shown in a plan view in FIG. 7. In FIG. 7, a support frame 6D is sandwiched between the electrode plate 5 and the electrode plate 7 instead of the support frame 6 shown in FIGS. 1 to 3. The support frame 6D is provided with the projection 64 same as the case of the support frame 6, but is not provided with the attenuation chamber 62 or the elastic piece 63. The support frame 6B is formed at its central portion with a circular opening 61B, the electroosmotic member 3 is fitted into the opening 61B without through the cushioning 65 and is located therein. The electroosmotic member 3 can be positioned precisely by elastic projections (preferably, three projections). The thickness of the support frame 6D is equal to that of the electroosmotic member 3, and both surfaces of the support frame 6D are flush with both surfaces of the electroosmotic member 3. Other structure is the same as that of the first embodiment.

In this case, the electrode plate 5, the electrode plate 7, the conductive adhesive 92 and the conductive adhesive 93 function as seals instead of the cushioning.

With this structure also, when impact or vibration is applied, the elastic projections 64 are deformed in the gap between the edge of the electroosmotic member 3 and the wall of the opening 61, this can reduce a load to be applied to the electroosmotic member 3, and it is possible to prevent the electroosmotic member 3 from being damaged.

<Fifth Embodiment>

Figure 8:
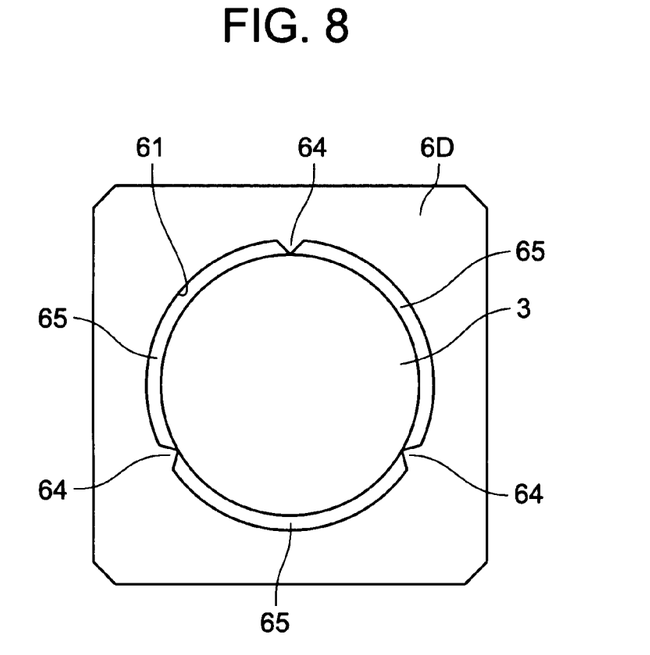
FIG. 8 is a plan view of a support member and an electroosmotic member according to a fifth embodiment.

The support structure of the electroosmotic member 3 may be changed as shown in the plan view in FIG. 8. The fifth embodiment is different from the fourth embodiment in that the support structure includes the cushioning 65. Other structure is the same as that of the fourth embodiment.

In this case, the electroosmotic member 3 is supported by the cushioning 65 together with the elastic projections 64, and the position of the electroosmotic member 3 can precisely be determined by the elastic projections. With such a structure also, when impact or vibration is applied, the elastic projections are elastically deformed together with the cushioning 65, a load applied to the electroosmotic member 3 can be reduced, and it is possible to prevent the electroosmotic member 3 from being damaged.

<Sixth Embodiment>

Figure 9:
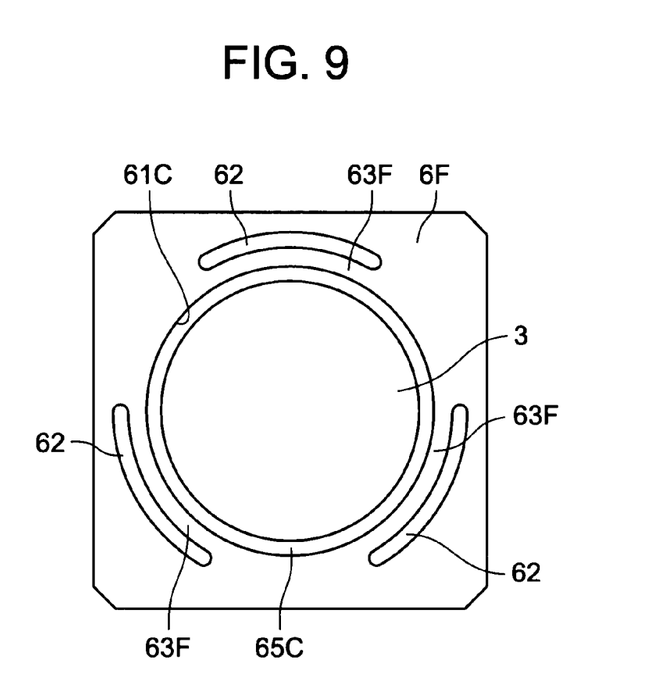
FIG. 9 is a plan view of a support member and an electroosmotic member according to a sixth embodiment.

The support structure of the electroosmotic member 3 may be changed as shown in the plan view in FIG. 9. In FIG. 9, a support frame 6F is sandwiched between the electrode plate 5 and the electrode plate 7 instead of the support frame 6 shown in FIGS. 1 to 3. The support frame 6F is provided with the attenuation chamber 62 and the elastic piece 63F of the support frame 6, but is not provided with the projections 64. The support frame 6F is formed at its central portion with a circular opening 61C, the electroosmotic member 3 is fitted into the opening 61C, and a barycenter of the electroosmotic member 3 is located at the center of the opening 61C. A gap between the edge of the electroosmotic member 3 and the wall of the opening 61C is filled with a cushioning 65C. The thickness of the support frame 6F is equal to that of the electroosmotic member 3, and both surfaces of the support frame 6F are flush with both surfaces of the electroosmotic member 3. Other structure is the same as that of the first embodiment.

According to this structure also, in a structure supporting the electroosmotic member 3, the attenuation chamber 62 functions as a damper which releases a stress of the elastic piece 63F, and impact and vibration can be absorbed. Since the cushioning 65C is made of rubber elastic material, the shock absorption effect can further be enhanced, and the electroosmotic member 3 can be prevented from being damaged.

<Seventh Embodiment>

Figure 10:
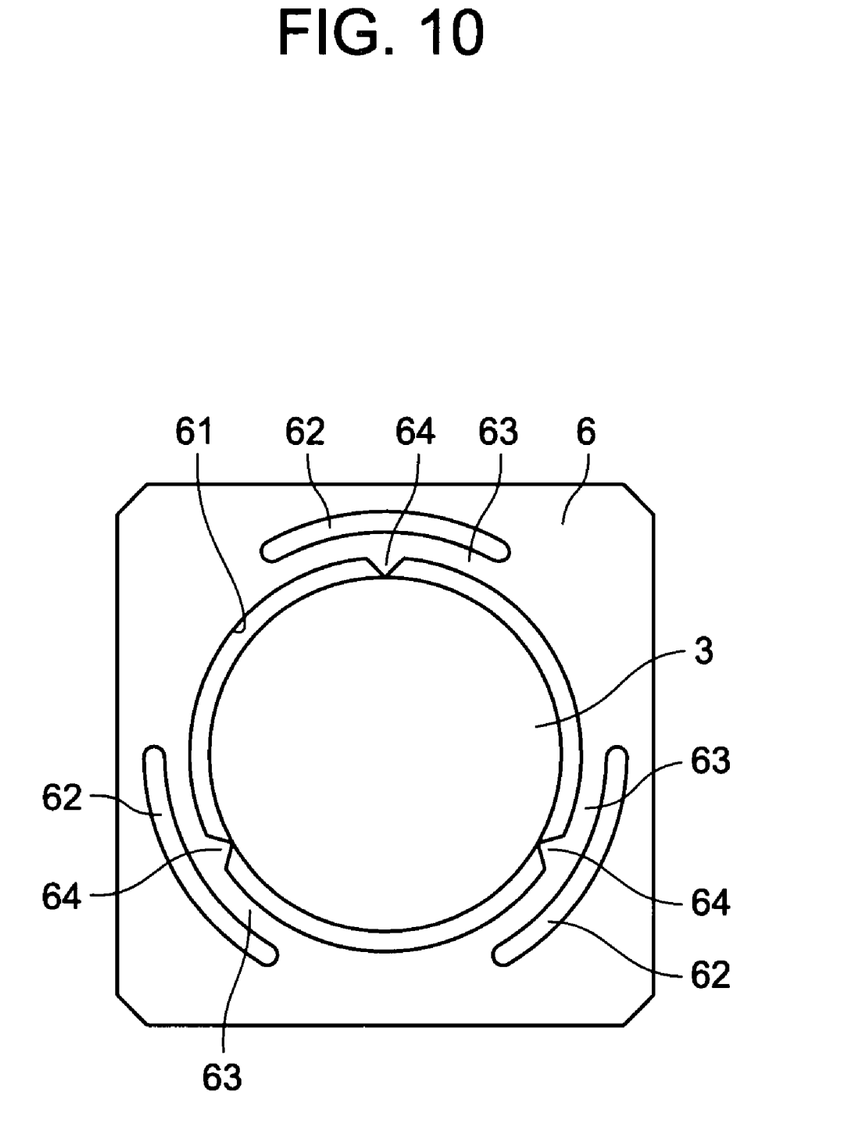
FIG. 10 is a plan view of a support member and an electroosmotic member according to a seventh embodiment.

The support structure of the electroosmotic member 3 may be changed as shown in the plan view in FIG. 10. In FIG. 10, the support structure is different from that shown in FIG. 3 in that there is no cushioning 65. Other structure is the same as that of the first embodiment.

In this case, the electrode plate 5, the electrode plate 7, the conductive adhesive 92 and the conductive adhesive 93 function as seals instead of the cushioning.

According to this structure also, in a structure supporting the electroosmotic member 3, the attenuation chamber 62 functions as a damper which releases a stress of the elastic piece 63, and impact and vibration can be absorbed. Further, since the elastic projections are deformed in the gap between the edge of the electroosmotic member 3 and the wall of the opening 61, a load to be applied to the electroosmotic member 3 can be reduced, and it is possible to prevent the electroosmotic member 3 from being damaged.

<Eighth Embodiment>

Figure 11:
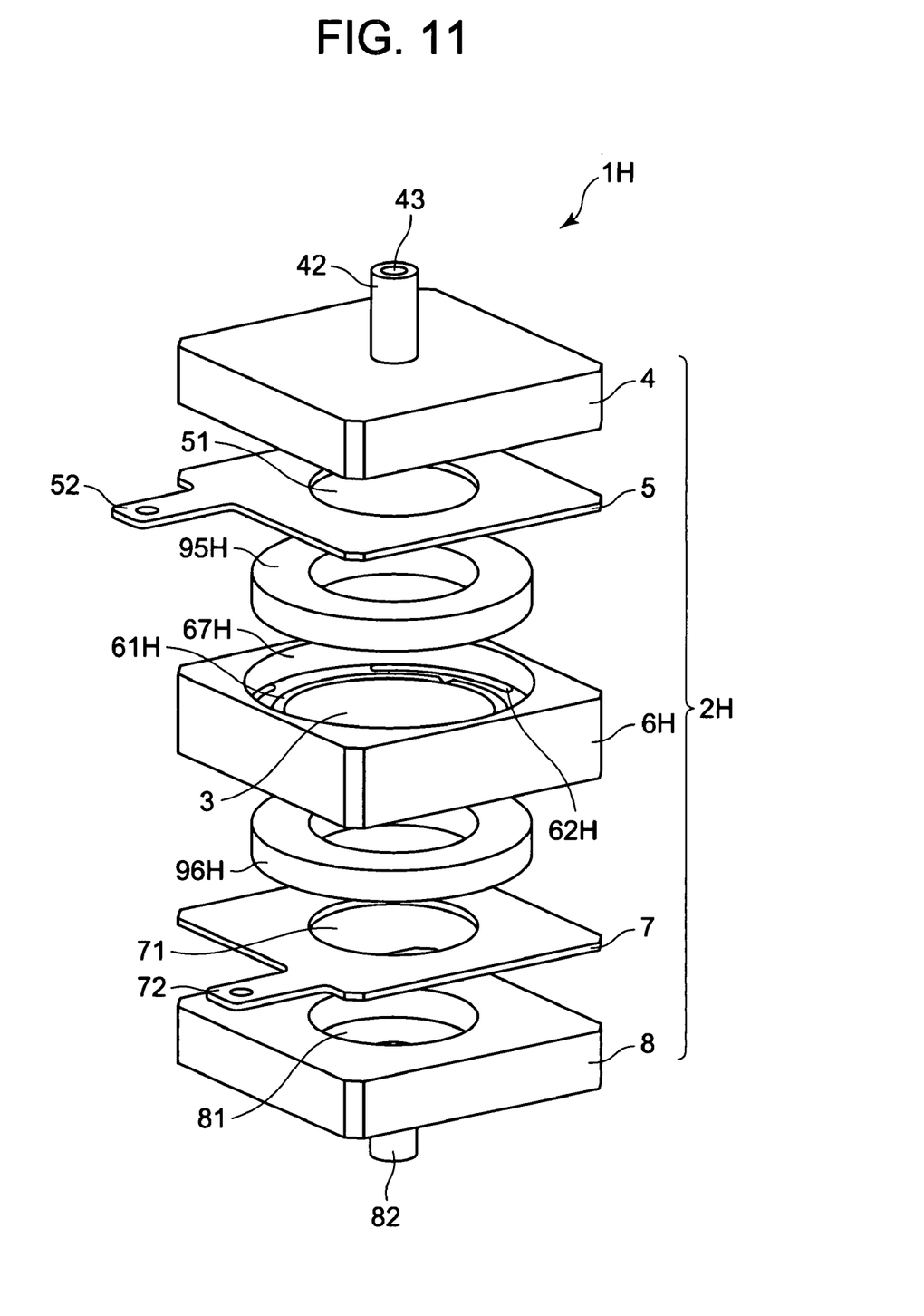
FIG. 11 is an exploded perspective view of an electroosmosis pump according to an eighth embodiment.
Figure 12:
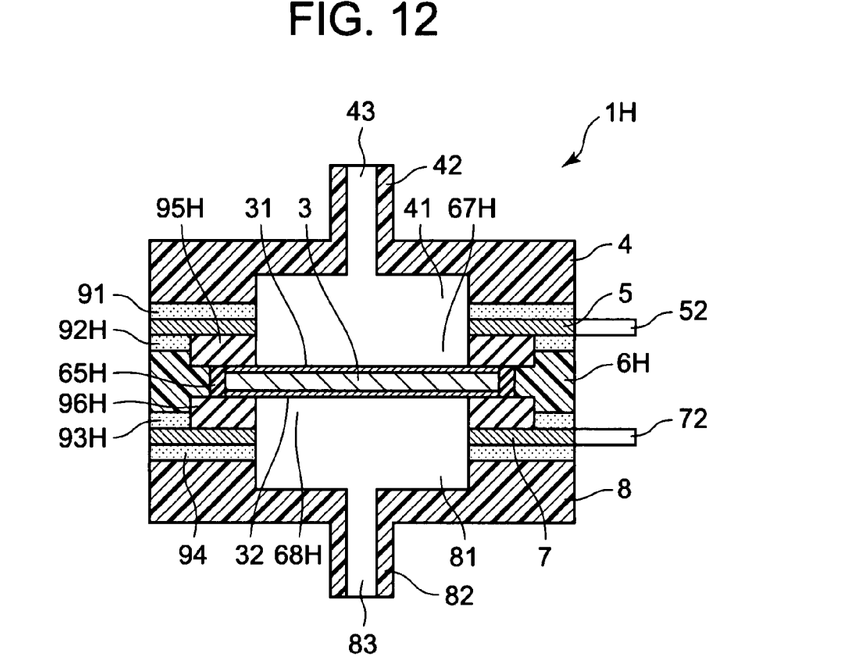
FIG. 12 is a vertical sectional view of the electroosmotic member in the eighth embodiment.

FIG. 11 is an exploded perspective view of an electroosmosis pump 1H according to an eighth embodiment. FIG. 12 is a vertical sectional view of an electroosmosis pump 1H. The electroosmosis pump 1H includes a housing 2H, and a thick plate-like electroosmotic member 3 which partitions a space in the housing 2H into an inlet side and an outlet side. The housing 2H includes the inlet case 4, the electrode plate 5, the support frame 6H, the electrode plate 7 and the outlet case 8. Since the electroosmotic member 3, the inlet case 4, the electrode plate 5, the electrode plate 7 and the outlet case 8 are provided in the same manner as those of the first embodiment, these members are designated with the same symbols, and explanation thereof will be omitted.

The support frame 6H is sandwiched between the electrode plate 5 and the electrode plate 7 instead of the support frame 6 shown in FIGS. 1 to 3, and the electroosmotic member 3 is supported by the support frame 6H. The support structure of the electroosmotic member 3 will be explained concretely.

A circular recess 67H is formed in an upper surface of the support frame 6H, a circular recess 68H is formed in a lower surface of the support frame 6H, and a circular opening 61H is formed from a bottom of the circular recess 67H to a bottom of the opposite circular recess 68H such as to penetrate.

Figure 13:
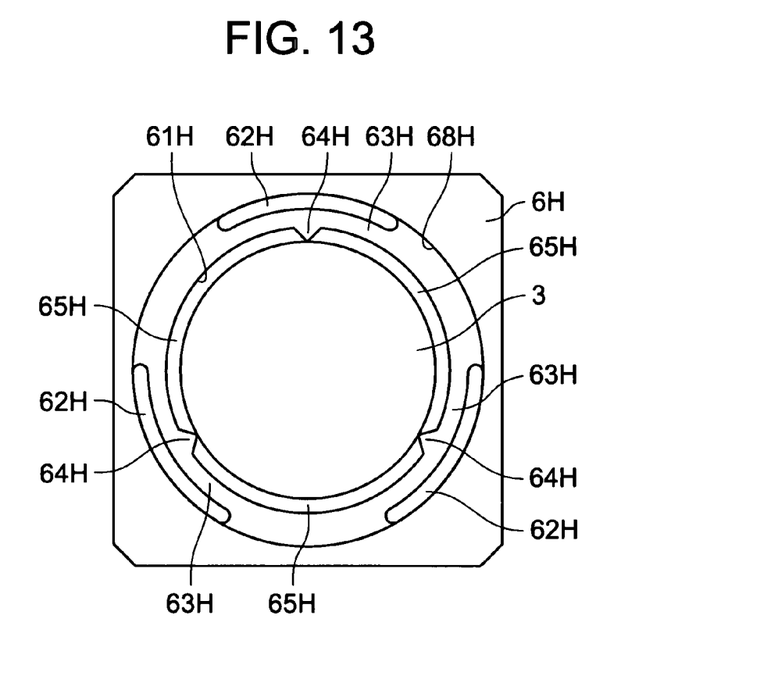
FIG. 13 is a plan view of a support member and an electroosmotic member in the eighth embodiment.

FIG. 13 is a plan view of the support frame 6H. As shown in FIG. 13, three attenuation chambers 62H are formed in the support frame 6H around the opening 61H. Each of the attenuation chambers 62H is a hole formed from a bottom of the circular recess 67H to a bottom of the opposite side circular recess 68H such as to penetrate the recesses, and is formed into an arc shape along the circumferential direction of the opening 61H. Since the attenuation chambers 62H penetrate, elastic pieces 63H dividing the attenuation chambers 62H and the opening 61H are formed, and each the elastic piece 63H is also formed into an arc shape along the circumferential direction of the opening 61H. The projections 64H provided at the central portions in the circumferential direction of the elastic pieces 63H project toward the center of the opening 61H. The electroosmotic member 3 is fitted into the opening 61H, the edge of the electroosmotic member 3 abuts against the three projections 64H, and the electroosmotic member 3 is supported by the three projections 64H and three elastic pieces 63H. A gap between the edge of the electroosmotic member 3 and the wall of the opening 61H is filled with a cushioning 65H made of rubber elastic material.

As shown in FIGS. 11 to 12, a ring-like rubber elastic material 95H is fitted into the circular recess 67H. An outer diameter of the rubber elastic material 95H is substantially equal to an inner diameter of the circular recess 67H, and an inner diameter of the rubber elastic material 95H is smaller than a diameter of the electroosmotic member 3. Thus, upper sides of the three attenuation chambers 62H are closed by the rubber elastic material 95H, and the electrode film 31 abuts against the rubber elastic material 95H at the edge portion of the electroosmotic member 3. The rubber elastic material 95H has conductive and elastomer properties.

The support frame 6H is adhered to the electrode plate 5 by an adhesive 92H, and the rubber elastic material 95H abuts against the electrode plate 5. Thus, the electrode film 31 of the electroosmotic member 3 is electrically in contact with the electrode plate 5 through the rubber elastic material 95H.

A ring-like rubber elastic material 96H is fitted into the circular recess 68H. An outer diameter of the rubber elastic material 96H is substantially equal to an inner diameter of the circular recess 68H, and an inner diameter of the rubber elastic material 96H is smaller than a diameter of the electroosmotic member 3. Thus, lower sides of the three attenuation chambers 62H are closed by the rubber elastic material 96H, and the electrode film 32 abuts against the rubber elastic material 96H at the edge portion of the electroosmotic member 3. The rubber elastic material 96H has conductive and elastomer properties.

The support frame 6H is adhered to the electrode plate 7 by an adhesive 93H, and the rubber elastic material 96H abuts against the electrode plate 7. Thus, the electrode film 32 of the electroosmotic member 3 is electrically in contact with the electrode plate 5 through the rubber elastic material 96H. The adhesive 92H and 93H may be insulative adhesives or may be conductive adhesives.

In this embodiment also, the electroosmotic member 3 is supported by the three projections 64H and there elastic pieces 63H, and the projections 64H, the elastic pieces 63H and the attenuation chambers 62H function as dampers and thus, impact and vibration can be absorbed. Further, impact or vibration applied in a direction intersecting with a radial direction of the electroosmotic member 3 (direction perpendicular to the paper sheet of FIG. 13) are absorbed by the rubber elastic materials 95H and 96H. Thus, it is possible to prevent the electroosmotic member 3 from being damaged.

Like the notch 62A shown in FIG. 4, the attenuation chamber 62H need not be a hole and may be a notch.

In that case also, the support structure of the electroosmotic member 3 may be of a structure shown in FIGS. 5 to 10 like the first embodiment.

<Electric Power Generation Apparatus Using Electroosmosis Pump, and Electronic Equipment Using the Electric Power Generation Apparatus>

Next, a use of the electroosmosis pump 1 will be explained.

Figure 14:
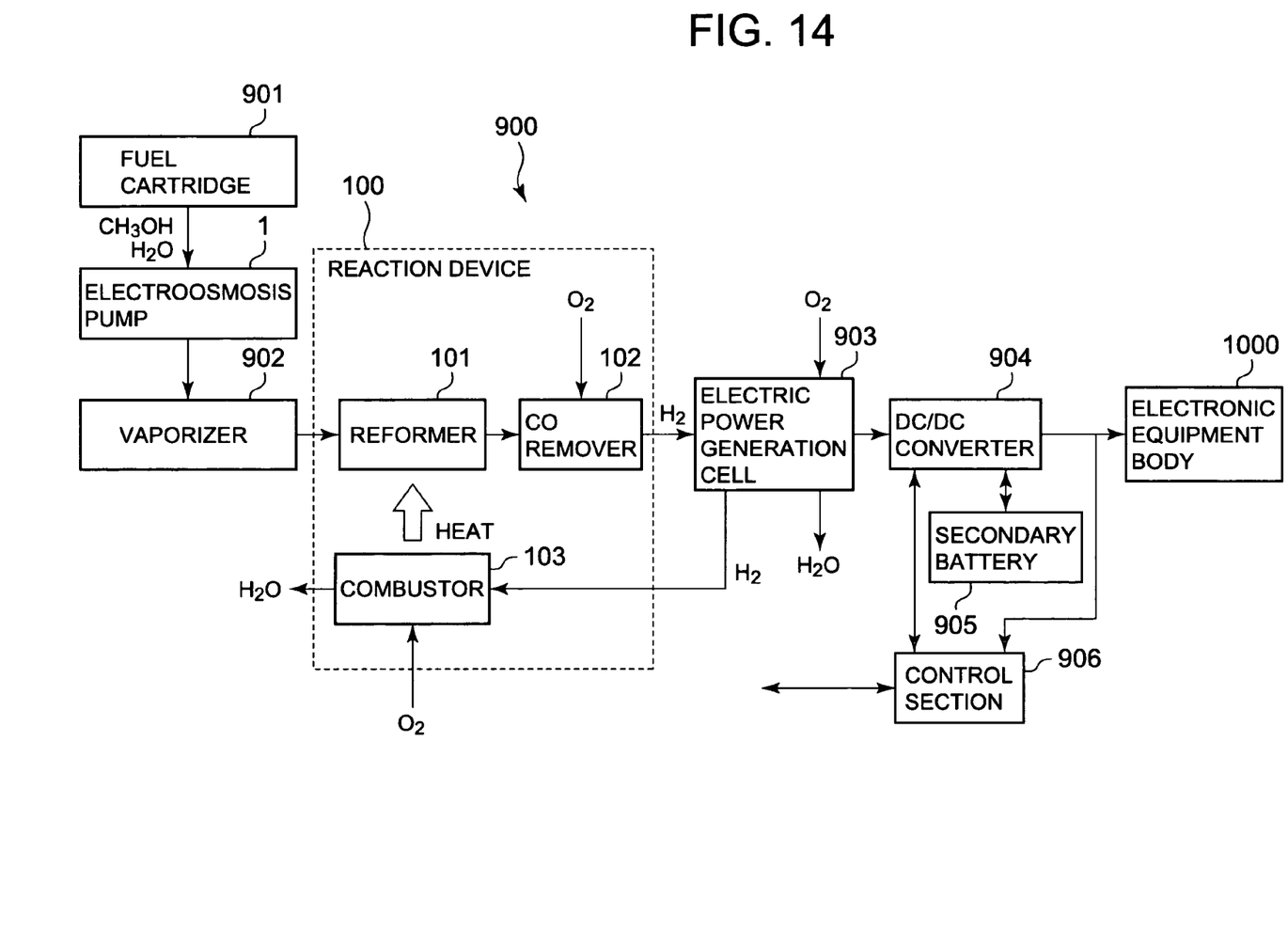
FIG. 14 is a block diagram of an electric power generation apparatus using an electroosmosis pump and an electronic equipment using the electric power generation apparatus.

The electroosmosis pump 1 can be used in an electric power generation apparatus 900 as shown in FIG. 14. The electric power generation apparatus 900 is provided in an electronic equipment, electric energy is supplied to an electronic equipment body 1000 from the electric power generation apparatus 900, and the electronic equipment body 1000 is operated.

The electric power generation apparatus 900 includes a fuel cartridge 901 in which fuel (e.g., methanol, ethanol, dimethyl ether) and water are stored in the form of liquid, an electroosmosis pump 1 for sending, to a vaporizer 902, water and fuel supplied from the fuel cartridge 901, a vaporizer 902 for vaporizing fuel and water sent from the electroosmosis pump 1, a multifunction micro reaction device 100 for generating hydrogen gas from fuel and water sent from the vaporizer 902, a fuel cell type electric power generation cell 903 for producing electric energy by electrical chemical reaction of hydrogen gas supplied from the multifunction micro reaction device 100, a DC/DC converter 904 for converting, into appropriate voltage, electric energy produced by the electric power generation cell 903, a secondary battery 905 connected to the DC/DC converter 904, and a control section 906 for controlling these elements. The multifunction micro reaction device 100 includes a reformer 101, a CO remover 102 and a combustor 103.

If the electroosmosis pump 1 is driven, mixture liquid of fuel and water is sent to the vaporizer 902 from the fuel cartridge 901, fuel and water vaporized by the vaporizer 902 flow into the reformer 101 of the multifunction micro reaction device 100. In a steam reforming reaction process in the reformer 101, a fuel and water mixture is converted into hydrogen and a small amount of carbon dioxide, a trace of carbon monoxide, thereby the hydrogen gas is produced (when fuel is methanol, see the following chemical equations (1) and (2)). The hydrogen gas and the like produced by the reformer 101 are sent to the CO remover 102, and outside air is also sent to the CO remover 102. In the CO remover 102, a preferential oxidation of CO reaction in which carbon monoxide gas is oxidized preferentially by a carbon monoxide removal catalyst, and the carbon monoxide gas is removed (see the following chemical equation (3)). Hydrogen gas which passed through the CO remover 102 is supplied to an anode of the electric power generation cell 903, air is supplied to a cathode of the electric power generation cell 903, and electric energy is produced by electrochemical reaction in the electric power generation cell 903.

$$CH_3OH + H_2O \rightarrow 3H_2 + CO_2 \quad (1)$$

$$H_2 + CO_2 \rightarrow H_2O + CO \quad (2)$$

$$2CO + O_2 \rightarrow 2CO_2 \quad (3)$$

The DC/DC converter 904 has a function to convert electric energy produced by the electric power generation cell 903 into appropriate voltage and then supplying the voltage to the electronic equipment body 1000, and also has a function to allow the secondary battery 905 to become charged with electric energy produced by the electric power generation cell 903, and to supply electric energy accumulated in the secondary battery 905 to the electronic equipment body 1000 when the electric power generation cell 903 and the multifunction micro reaction device 100 are not operated. The control section 906 controls a not-shown pump, a valve, a heater and the like which are required for operating the vaporizer 902, the multifunction micro reaction device 100 and the electric power generation cell 903, and also controls the electroosmosis pump 1 and the DC/DC converter 904. The control section 906 also controls such that electric energy is stably supplied to the electronic equipment body 1000.

A portion of the hydrogen gas supplied to the anode of the electric power generation cell 903 does not react, and remained hydrogen gas is supplied to the combustor 103. Air is supplied to the combustor 103 in addition to hydrogen gas, the hydrogen gas is oxidized by a catalyst in the combustor 103, and combustion heat is generated, the reformer 101 is heated by heat generated in the combustor 103.

Although the electroosmosis pump 1 in the first embodiment is used in FIG. 14, the electroosmosis pump in any one of the first to eighth embodiments may be used.

All of the disclosures including the patent specification, the claims, the attached drawings and the abstract of Japanese Patent Application No. 2006-249357 filed Sep. 14, 2006 are herein incorporated by reference.

Although various typical embodiments have been shown and described, the present invention is not limited to those embodiments. Consequently, the scope of the present invention can be limited only by the following claims.

What is claimed is:

1. An electroosmosis pump adapted to be mounted in an electric power generation apparatus having a fuel cell, the electroosmosis pump comprising:
    a housing having a hollow portion;
    an electroosmotic member accommodated in the housing to partition the hollow portion into an introducing side and a discharge side;
    a space formed in the housing peripheral to the electroosmotic member; and
    an elastic piece which separates the hollow portion and the space from each other such that the hollow portion and the space do not communicate with each other, and which supports the electroosmotic member.

2. The electroosmosis pump according to claim 1, further comprising a cushioning filled in a gap between a wall of the hollow portion and an edge of the electroosmotic member.

3. The electroosmosis pump according to claim 1, wherein the electroosmosis pump comprises a plurality of the elastic pieces and a plurality of the spaces, and wherein the plurality of elastic pieces and the plurality of spaces are arranged around the electroosmotic member.

4. The electroosmosis pump according to claim 1, further comprising a projection provided on the elastic piece so as to project toward the hollow portion, wherein the electroosmotic member is supported by the projection and the elastic piece.

5. An electric power generation apparatus having the electroosmosis pump according to claim 1 mounted therein, wherein the electroosmosis pump sends fuel to the electric power generation apparatus, and the electric power generation apparatus generates electricity with the sent fuel.

6. An electronic equipment having the electric power generation apparatus according to claim 5, the electronic equipment comprising:
    an electronic equipment body which operates using the electricity generated by the electric power generation apparatus.

* * * * *